(12) United States Patent
Rogers

(10) Patent No.: US 11,737,448 B1
(45) Date of Patent: Aug. 29, 2023

(54) POISON BAIT STATION DEVICE AND ASSOCIATED METHODS

(71) Applicant: Richard Jess Rogers, Butte, MT (US)

(72) Inventor: Richard Jess Rogers, Butte, MT (US)

( * ) Notice: Subject to any disclaimer, the term of this patent is extended or adjusted under 35 U.S.C. 154(b) by 0 days.

(21) Appl. No.: 17/817,131

(22) Filed: Aug. 3, 2022

(51) Int. Cl.
*A01M 25/00* (2006.01)

(52) U.S. Cl.
CPC .............................. *A01M 25/004* (2013.01)

(58) Field of Classification Search
CPC .. A01M 25/00; A01M 25/002; A01M 25/004; A01M 23/00; A01M 23/08; A01M 23/16; A01M 23/18; A01M 23/245
USPC ................ 43/131, 58, 60, 61, 64, 65, 67, 96
See application file for complete search history.

(56) References Cited

U.S. PATENT DOCUMENTS

| | | | | |
|---|---|---|---|---|
| 1,634,177 A | * | 6/1927 | Dart | A01M 23/00 43/96 |
| 2,573,228 A | * | 10/1951 | Slauth | A01M 23/18 43/61 |
| 3,094,805 A | * | 6/1963 | Luck | A01M 25/004 43/131 |
| 3,398,478 A | * | 8/1968 | Pearsall | A01M 23/005 43/65 |
| 4,058,928 A | * | 11/1977 | Digman, Sr. | A01M 1/02 43/131 |
| 4,231,180 A | * | 11/1980 | Bare | A01M 23/02 43/61 |
| 4,400,904 A | * | 8/1983 | Baker | A01M 25/004 43/131 |
| 4,569,149 A | * | 2/1986 | Sensing | A01M 23/18 43/61 |
| 4,630,392 A | * | 12/1986 | Ferraro | A01M 25/004 43/131 |
| 4,633,610 A | * | 1/1987 | Thompson | A01M 23/24 43/61 |
| 4,746,033 A | * | 5/1988 | Morellini | A01M 25/00 222/129 |
| 4,769,942 A | * | 9/1988 | Copenhaver, Sr. | A01M 25/004 43/61 |
| 4,819,368 A | * | 4/1989 | Fodor | A01M 23/18 43/61 |

(Continued)

FOREIGN PATENT DOCUMENTS

| | | | |
|---|---|---|---|
| CH | 248398 A | * | 5/1947 |
| DE | 668514 C | * | 12/1938 |

(Continued)

*Primary Examiner* — Darren W Ark
(74) *Attorney, Agent, or Firm* — Collaborative IP; Paul Ditmyer

(57) ABSTRACT

The poison bait station device is for elimination of rodents such as mice. The device includes an elongated tubular housing having a rodent entrance at one end and an end wall at an opposite end thereof, with a through-hole in the end wall. A bait station line (e.g. wire or cable) extends through the through-hole and includes a bait attachment feature at a first end thereof configured to be extended out through the rodent entrance for attaching poison bait thereto, and configured to be retracted within the elongated tubular housing for safely setting the poison bait therein. A structure attachment feature is at an opposite end of the bait station line and is configured to be securely attached to a structure in a local environment.

18 Claims, 1 Drawing Sheet

(56) References Cited

U.S. PATENT DOCUMENTS

| | | | | |
|---|---|---|---|---|
| 4,823,504 A * | 4/1989 | Ronning | A01M 23/26 | 43/96 |
| 4,949,499 A * | 8/1990 | Lindros, Jr. | A01M 23/16 | 43/67 |
| 5,175,957 A * | 1/1993 | West | A01M 23/16 | 43/61 |
| 5,235,778 A * | 8/1993 | Sutherlin | A01M 23/18 | 43/61 |
| 5,673,509 A * | 10/1997 | Gatewood, Jr. | A01M 23/005 | 383/106 |
| 5,813,165 A * | 9/1998 | Dougherty, Sr. | A01M 23/34 | 43/43.1 |
| 6,202,341 B1 * | 3/2001 | Bernard | A01M 1/2011 | 43/131 |
| 6,327,809 B1 * | 12/2001 | Comes | A01M 23/16 | 43/87 |
| 6,474,015 B1 * | 11/2002 | Lund | A01M 1/2011 | 43/131 |
| 6,564,501 B1 * | 5/2003 | Schislyonok | A01M 23/18 | 43/61 |
| 6,671,998 B1 * | 1/2004 | Lawrence, Sr. | A01M 23/08 | 43/58 |
| 7,076,914 B1 * | 7/2006 | Howse | A01M 1/2055 | 43/132.1 |
| 9,663,068 B1 * | 5/2017 | Sykora | B60R 99/00 | |
| 10,165,769 B2 * | 1/2019 | Lewis | A01M 25/004 | |
| 11,064,692 B2 * | 7/2021 | Michalski | A01M 25/004 | |
| 11,272,702 B1 * | 3/2022 | Oppenberg | A01M 25/004 | |
| 11,470,835 B1 * | 10/2022 | Shoemaker, Jr. | A01M 23/16 | |
| 2004/0200131 A1 * | 10/2004 | Middlebrook | A01M 25/004 | 43/124 |
| 2005/0274057 A1 * | 12/2005 | McCulloch | A01M 23/24 | 43/85 |
| 2005/0284015 A1 * | 12/2005 | Greisman | A01M 23/20 | 43/60 |
| 2006/0218850 A1 * | 10/2006 | Thormodson | A01M 23/20 | 43/61 |
| 2007/0277425 A1 * | 12/2007 | Beck | A01M 23/08 | 43/65 |
| 2008/0086932 A1 * | 4/2008 | Cook | A01M 1/02 | 43/107 |
| 2010/0257774 A1 * | 10/2010 | Middlebrook | A01M 25/004 | 43/131 |
| 2010/0325941 A1 * | 12/2010 | Bolin | A01M 1/2016 | 43/131 |
| 2011/0078939 A1 * | 4/2011 | Liao | A01M 23/18 | 43/61 |
| 2011/0138676 A1 * | 6/2011 | Moustirats | A01M 23/20 | 43/61 |
| 2011/0258907 A1 * | 10/2011 | Endepols | A01M 25/004 | 43/131 |
| 2012/0167448 A1 * | 7/2012 | Collins, II | A01M 23/34 | 43/58 |
| 2012/0233908 A1 * | 9/2012 | Drake | A01M 25/004 | 43/131 |
| 2012/0279110 A1 * | 11/2012 | Finotello | A01M 25/004 | 43/131 |
| 2012/0297663 A1 * | 11/2012 | Middlebrook | A01M 25/004 | 43/131 |
| 2014/0059919 A1 * | 3/2014 | Pupello | A01M 25/004 | 43/131 |
| 2014/0196357 A1 * | 7/2014 | Firth | A01M 25/006 | 43/131 |
| 2016/0015021 A1 * | 1/2016 | Green | A01M 23/00 | 43/131 |
| 2017/0035043 A1 * | 2/2017 | Lewis | A01M 25/004 | |
| 2017/0231214 A1 * | 8/2017 | Vaisblat | A01M 31/002 | 43/60 |
| 2017/0265452 A1 * | 9/2017 | Leasure | A01M 23/26 | |
| 2017/0295773 A1 * | 10/2017 | Michalski | A01M 25/004 | |
| 2019/0029244 A1 * | 1/2019 | Steele | A01M 1/06 | |
| 2019/0093301 A1 * | 3/2019 | Stephens | A01M 23/02 | |
| 2019/0104726 A1 * | 4/2019 | Grover | A01M 23/245 | |
| 2019/0343108 A1 * | 11/2019 | Theriault | A01M 23/30 | |
| 2020/0015463 A1 * | 1/2020 | Norburn | A01K 69/08 | |
| 2020/0128811 A1 * | 4/2020 | Evans | A01M 23/005 | |
| 2020/0281187 A1 * | 9/2020 | Schulze | A01M 25/004 | |
| 2020/0296952 A1 * | 9/2020 | Kinney | A01M 23/08 | |

FOREIGN PATENT DOCUMENTS

| | | | | |
|---|---|---|---|---|
| DE | 802772 C | * | 2/1951 | |
| DE | 1295921 B | * | 5/1969 | |
| DE | 1482371 A1 | * | 6/1969 | |
| DE | 202020100577 U1 | * | 5/2020 | |
| DE | 202021102748 U1 | * | 7/2021 | |
| EP | 3732962 A1 | * | 11/2020 | |
| EP | 3785539 B1 | * | 11/2021 | A01M 25/004 |
| FR | 1360310 A | * | 5/1964 | |
| FR | 1418907 A | * | 11/1965 | |
| FR | 1463757 A | * | 7/1966 | |
| FR | 3076748 B1 | * | 7/2020 | A01M 1/20 |
| JP | 2019140928 A | * | 8/2019 | |
| WO | WO-02096197 A1 | * | 12/2002 | A01M 1/026 |
| WO | WO-03051112 A1 | * | 6/2003 | A01M 1/2011 |
| WO | WO-2011076597 A1 | * | 6/2011 | A01M 25/004 |

* cited by examiner

POISON BAIT STATION DEVICE AND ASSOCIATED METHODS

FIELD

The present invention relates in general to the field of poison bait devices, and particularly to devices and methods for safely placing poison bait for consumption by rodents.

BACKGROUND

Various poison bait stations for pests and rodents are known in the art. Examples of such poison bait stations are described below.

U.S. Pat. No. 6,082,042 to Issitt entitled "Tamper resistant bait station for rats" is directed to a bait station for containing rat poison and includes a housing; at least one opening in the housing for a rat to enter; and a bait position in the housing for locating poisoned bait. A divider is provided between the bait position and each opening to prevent direct access to the bait from the opening, for example by a child. There are at least two different routes from the bait position leading to openings.

U.S. Pat. No. 11,064,692 to Michalski, et al. entitled "Bait box for separating a feeding location bait box for separating a feeding location" is directed to a bait box including a housing; a feeding location arranged in the housing and configured for a poison bait, wherein the feeding location is arranged in an air cushion in the housing so that the feeding location is accessible for a rodent from an outside of the bait box through an entry arranged at a lower end of the housing. A separation element defines a liquid space with a liquid within the housing when the liquid rises outside of the housing above a threshold level above which accessibility of the feeding location is not provided to the rodent any more, wherein the liquid space extends from the threshold level to the separation element and separates the feeding location from the liquid space, wherein the housing is closed air tight besides the entry so that the air cushion is captured in the housing.

U.S. Pat. No. 10,561,139 to Suteerawanit entitled "Anti-contamination rodent bait station" is directed to an anti-contamination bait station that includes a housing, rodent entrances into the housing, a removable or opening, lockable housing front, contamination guards above the rodent entrances, poison holders inside the housing, a removable tray, and powder insecticide slots at each end of the housing below the rodent entrances. A bottom portion of the housing provides space for common bricks arranged end to end. A center portion of the housing provides space for the removable tray. A top portion of the housing provides space for rodent poison blocks. The tray includes insecticide troughs at each end aligned with the insect slots and containing insecticide.

U.S. Pat. No. 8,028,468 to Walsh, et al. entitled "Bait station and detachable bait station base" is directed to a bait station system that has a bait station mounted to a base. The bait station has the general shape of a box with a locking hinged lid. The box has side walls with openings so that rodents can enter into the box and gain access to poison bait or a mechanical trap. The base has a lower tray for receiving a weight. The lower tray has a lower surface which may be glued, attached by a screw, bolt, or earth anchor to a planar surface. The bait station is releasably mounted to the base by a locking mechanism which can be unlocked only by gaining access to the interior of the box forming the bait station.

U.S. Pat. No. 4,364,194 to Clark, Sr. entitled "Assembly for poison baiting rodents" is directed to an assembly for poison baiting rodents that comprises a housing, an elongated hollow tubular element and a cover. The housing has an inner chamber that is sufficiently large to contain poison bait material. The elongated hollow tubular element has a coupling end and a length effective to fit the element inside the inner chamber of the housing when it is detached from the housing.

The various known poison bait stations have disadvantages. For example, the known stations may be complex, difficult to secure in place, allow access to the poison by non-targeted species, and other problems which may render them ineffective.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY

With the above in mind, embodiments of the present invention are related to a poison bait station that simply, safely and securely presents poison bait to rodents.

This and other objects, advantages and features in accordance with the present invention may be provided by a poison bait station device for elimination of rodents, the device including an elongated tubular housing having a rodent entrance at one end and an end wall at an opposite end thereof, with a through-hole in the end wall. A bait station line extends through the through-hole and includes a bait attachment feature at a first end thereof configured to be extended out through the rodent entrance for attaching poison bait thereto, and configured to be retracted within the elongated tubular housing for safely setting the poison bait therein. A structure attachment feature is at an opposite end of the bait station line and is configured to be securely attached to a structure in a local environment.

Additionally, and/or alternatively, the elongated tubular housing may be a circular cylindrical housing, a rectangular housing or a triangular housing.

Additionally, and/or alternatively, the bait station line is a cable, wire, or chain.

Additionally, and/or alternatively, the bait attachment feature at the first end of the bait station line includes a flexible wire configured to tie up the poison bait, and/or a bait clip configured to clip to the poison bait.

Additionally, and/or alternatively, the structure attachment feature at the opposite end of the bait station line includes a flexible wire configured to wrap around the structure in the local environment, and/or a fastener configured to fasten to the structure in the local environment or fasten to the bait station line wrapped around the structure.

Additionally, and/or alternatively, the elongated tubular housing includes a surface stabilizer configured to stabilize the elongated tubular housing on a surface.

Another embodiment is directed to a poison bait station device for elimination of pests, the device including an elongated tubular housing having a pest entrance at one end and an end wall at an opposite end thereof, and a bait station line slidably extending within the elongated tubular housing and out through a passage in the end wall, and including a bait attachment feature at a first end thereof configured to be extended out through the pest entrance for attaching poison bait thereto, and configured to be retracted within the elongated tubular housing for safely setting the poison bait therein. A structure attachment feature is at an opposite end of the bait station line, outside the end wall, and configured to be securely attached to a structure in a local environment.

Additionally, and/or alternatively, the elongated tubular housing comprises a circular cylindrical housing, a rectangular housing or a triangular housing.

Additionally, and/or alternatively, the bait station line comprises at least one of a cable, wire, and chain.

Additionally, and/or alternatively, the bait attachment feature at the first end of the bait station line comprises a flexible wire configured to tie up the poison bait, and/or a bait clip configured to clip to the poison bait.

Additionally, and/or alternatively, the structure attachment feature at the opposite end of the bait station line comprises a flexible wire configured to wrap around the structure in the local environment, and/or a fastener configured to fasten to the structure in the local environment or fasten to the bait station line wrapped around the structure.

Additionally, and/or alternatively, the elongated tubular housing includes a surface stabilizer configured to stabilize the elongated tubular housing on a surface.

BRIEF DESCRIPTION OF THE DRAWINGS

The example embodiments are best understood from the following detailed description when read with the accompanying drawing figures. In fact, the dimensions may be arbitrarily increased or decreased for clarity of discussion. Wherever applicable and practical, like reference numerals refer to like elements.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
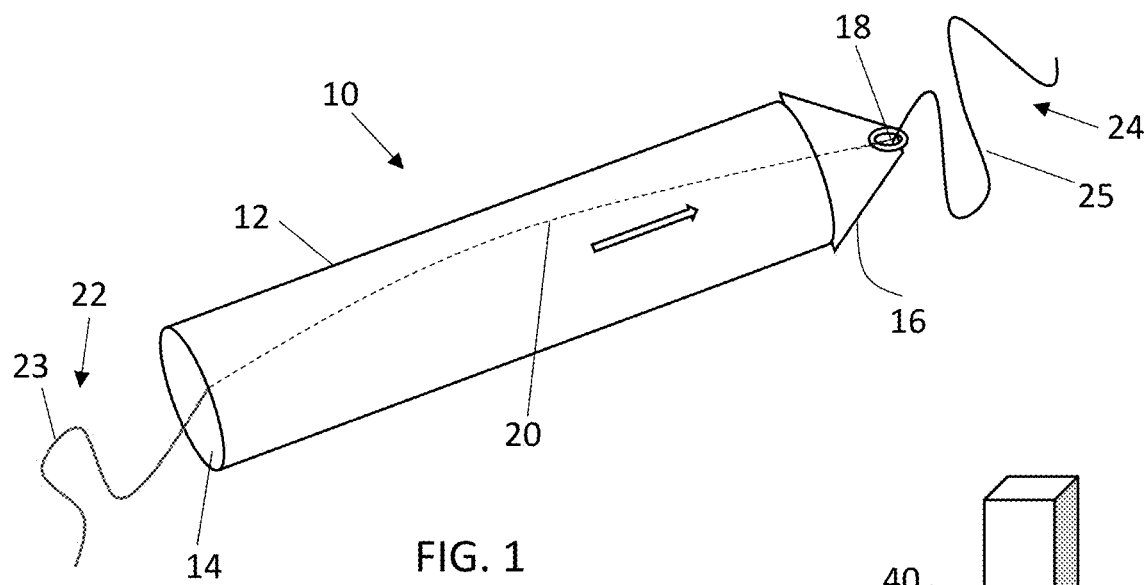
FIG. 1 is a perspective view of an embodiment of a poison bait station device in accordance with features of the present invention.

FIG. 1 illustrates an embodiment of poison bait station device 10 for elimination of rodents such as mice and rats. The device 10 includes an elongated tubular housing 12 having a rodent entrance 14 at one end, and an end wall 16 at an opposite end thereof. The elongated tubular housing 12 may be a circular or oval cylindrical housing, a rectangular housing or a triangular housing, for example. For example, the elongated tubular housing 12 may be about twelve inches long with about a 1.5 inch diameter. The end wall 16 may be a cone or cap, and there is a through-hole 18 in the end wall 16.

Figure 2:
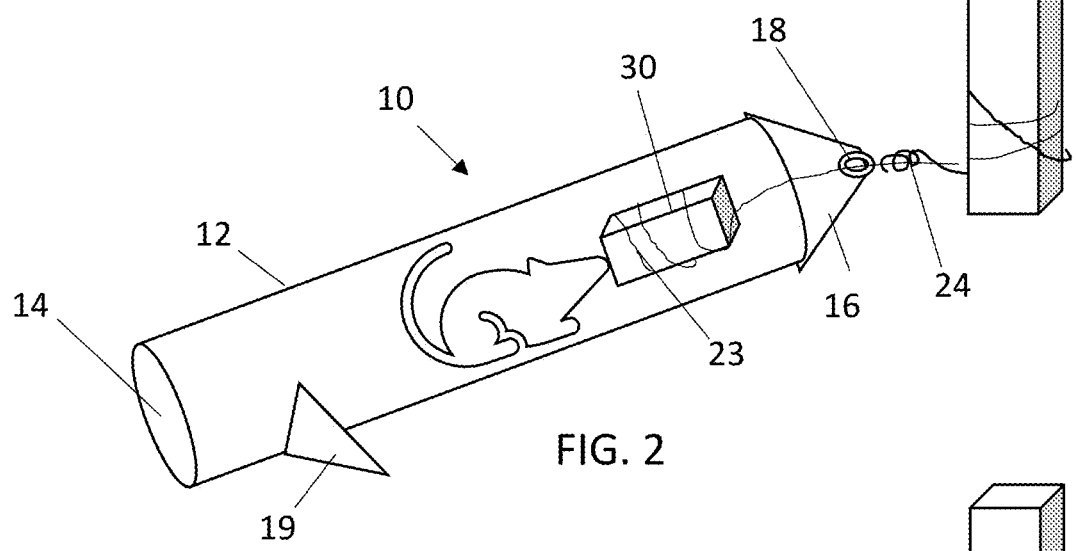
FIG. 2 is an perspective transparent view illustrating the poison bait station of FIG. 1 in operation.
Figure 3:
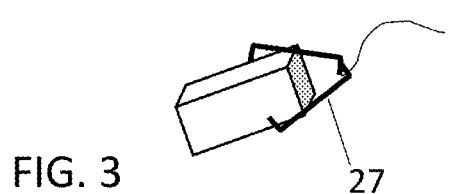
FIG. 3 is a perspective view of another embodiment of the bait attachment feature for the poison bait station of FIG. 1.

A bait station line 20 (e.g. a wire, cable or chain) extends through the through-hole 18 and includes a bait attachment feature 22 at a first end thereof. A plug may also be included at the end of the bait station line 20 so that it cannot be pulled entirely through the through-hole 18. The bait station line 20 is configured to be extended out through the rodent entrance 14 for attaching poison bait to the bait attachment feature 22. For example, the bait station line 20 may be twenty four inches long. The bait station line 20, along with the bait attachment feature 22, and the bait 30, are configured to be retracted within the elongated tubular housing 12 for safely setting the poison bait 30 therein as illustrated in FIG. 2. The bait attachment feature 22 at the first end of the bait station line 20, as illustrated, includes a flexible wire 23 configured to tie up the poison bait 30. Other types of attachment features are contemplated as long as they securely attach the poison to the bait station line 20. For example, in another embodiment (FIG. 3) the bait attachment feature 22 may include a spring loaded bait clip 27 configured to clip to the poison bait 30.

There are many types of poison baits available for use in the bait station device 10, for example, the Just One Bite Bar by Farnam.

Figure 4:
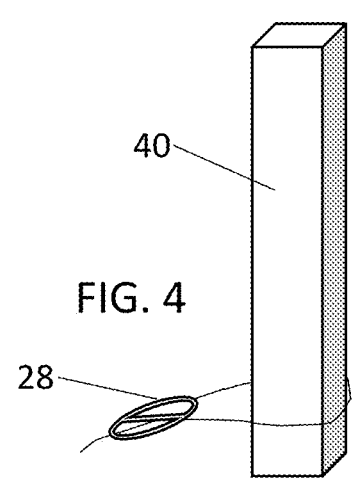
FIG. 4 is a perspective view of another embodiment of the structure attachment feature for the poison bait station of FIG. 1.

A structure attachment feature 24 is at an opposite end of the bait station line 20 and is configured to be securely attached to a structure 40 (e.g. a post, furniture, or other hardware) in a local environment. As illustrated, the structure attachment feature 24 at the opposite end of the bait station line 20 includes a flexible wire 25 configured to wrap around the structure 40. Other types of attachment features are contemplated as long as they securely attach the structure to the bait station line 20 and thereby secure the bait station 10 in place. For example, in another embodiment (FIG. 4) the structure attachment feature 24 includes a fastener 28 configured to fasten to the structure 40 or be wrapped or looped around the structure 40 and fastened back to the bait station line 20. Alternatively, the structure attachment feature 24 may be independent and separate of the bait station line 20.

In use, the user will attach the bait 30 to the bait station line 20 via the bait attachment feature 22. The user will then retract the bait 30 into the elongated tubular housing 12 by pulling the bait station line 20 from the opposite end adjacent the structure attachment feature 24. The bait 30 is now safely away from the rodent entrance 14 and can only be accesses by a small rodent such as a mouse. The bait station device 10 is now ready to be placed in a strategic spot so that it may be hidden, for example, and secured to a structure 40. Rodents, such as mice, will temporarily enter the bait station device 10 via the rodent entrance 14 and eat the poison bait 30. Depending on the type of poison bait 30, the rodent will then typically exit the bait station device 10 and return to the nest and die.

Referring to FIG. 2, the elongated tubular housing 12 may include a surface stabilizer 19 (e.g. a foot or bracket) configured to stabilize the elongated tubular housing on a surface, i.e. to prevent the bait station device 10 from rolling or tipping over while in use, and/or for keeping the bait station 10 slightly off the ground.

As described above, the embodiments are simple to use, just extend the bait lock line and add your preferred bait and retract the bait into the housing, and then optionally secure the housing to a structure with the attachment feature at the opposite end of the bait lock line.

The device 10 may be formed from durable materials such as hard plastic or metal, and may be manufactured via molding, extrusion and/or 3D printing, for example. The device is pet and child friendly because it is enclosed, tamper-resistant, secured in place, and safe for pets and non-target species. The device is easy to install and includes a durable, weather resistant arrangement for both indoor and outdoor use, which will leave the space safe, clean and pest-free.

Many mouse bait boxes claim to be safe for children and pets but are actually quite dangerous because they are flimsy and have cheap locks that are easily opened by little hands and pet paws. The present tamper-resistant poison bait stations are secured by a non-openable housing and only expose the bait inside. So while pests have easy access to the bait, little fingers and paws are kept safe from harm.

Keep your home safe and sanitary as the bait stations safely poison and eliminate mice and other small rodents, making elimination swift and cost-effective. The bait stations can be used with any mouse bait, poison or bait blocks, so you can choose whether to exterminate immediately or use slower-acting poison, to allow pests to die quietly elsewhere.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

The invention claimed is:

1. A poison bait station device for elimination of rodents, the device comprising:
   an elongated tubular housing having a rodent entrance at one end thereof and an end wall at an opposite end thereof;
   a through-hole in the end wall; and
   a bait station line comprising a single wire strand and extending, within the elongated tubular housing, from the rodent entrance and through the through-hole and including:
      a bait attachment feature at a first end thereof configured to be extended out through the rodent entrance for attaching poison bait thereto in a non-retracted state, and configured to be retracted within the elongated tubular housing for safely setting the poison bait therein in a retracted state, and
      a structure attachment feature at an opposite end thereof configured to be operated to retract the bait attachment feature within the elongated housing and then be securely attached to an external structure in a local environment that is not a part of the poison bait station.

2. The poison bait station device according to claim 1, wherein the elongated tubular housing comprises a circular cylindrical housing.

3. The poison bait station device according to claim 1, wherein the elongated tubular housing comprises a rectangular housing.

4. The poison bait station device according to claim 1, wherein the elongated tubular housing comprises a triangular housing.

5. The poison bait station device according to claim 1, wherein the bait attachment feature at the first end of the bait station line comprises a flexible wire configured to tie up the poison bait.

6. The poison bait station device according to claim 1, wherein the bait attachment feature at the first end of the bait station line comprises a bait clip configured to clip to the poison bait.

7. The poison bait station device according to claim 1, wherein the structure attachment feature at the opposite end of the bait station line comprises a flexible wire configured to wrap around the structure in the local environment.

8. The poison bait station device according to claim 1, wherein the structure attachment feature at the opposite end of the bait station line comprises a fastener configured to fasten to the structure in the local environment or fasten to the bait station line wrapped around the structure.

9. The poison bait station device according to claim 1, wherein the elongated tubular housing includes a surface stabilizer configured to stabilize the elongated tubular housing on a surface.

10. A poison bait station device for elimination of pests, the device comprising:
    an elongated tubular housing having a pest entrance at one end thereof and an end wall at an opposite end thereof; and
    a bait station line comprising a single wire strand and slidably extending within the elongated tubular housing from the rodent entrance and out through a passage in the end wall, and including:
       a bait attachment feature at a first end thereof configured to be extended out through the pest entrance for attaching poison bait thereto in a non-retracted state, and configured to be retracted within the elongated tubular housing for safely setting the poison bait therein in a retracted state, and
       a structure attachment feature at an opposite end thereof, outside the end wall, and configured to be operated to retract the bait attachment feature within the elongated housing and then be securely attached to an external structure in a local environment that is not a part of the poison bait station.

11. The poison bait station device according to claim 10, wherein the elongated tubular housing comprises a circular cylindrical housing.

12. The poison bait station device according to claim 10, wherein the elongated tubular housing comprises a rectangular housing.

13. The poison bait station device according to claim 10, wherein the elongated tubular housing comprises a triangular housing.

14. The poison bait station device according to claim 10, wherein the bait attachment feature at the first end of the bait station line comprises a flexible wire configured to tie up the poison bait.

15. The poison bait station device according to claim 10, wherein the bait attachment feature at the first end of the bait station line comprises a bait clip configured to clip to the poison bait.

16. The poison bait station device according to claim 10, wherein the structure attachment feature at the opposite end of the bait station line comprises a flexible wire configured to wrap around the structure in the local environment.

17. The poison bait station device according to claim 10, wherein the structure attachment feature at the opposite end of the bait station line comprises a fastener configured to fasten to the structure in the local environment or fasten to the bait station line wrapped around the structure.

18. The poison bait station device according to claim 10, wherein the elongated tubular housing includes a surface stabilizer configured to stabilize the elongated tubular housing on a surface.

\* \* \* \* \*